United States Patent
Asendorf et al.

(10) Patent No.: US 11,816,946 B2
(45) Date of Patent: Nov. 14, 2023

(54) IMAGE BASED NOVELTY DETECTION OF MATERIAL SAMPLES

(71) Applicant: 3M INNOVATIVE PROPERTIES COMPANY, St. Paul, MN (US)

(72) Inventors: Nicholas A. Asendorf, St. Paul, MN (US); Jennifer F. Schumacher, Woodbury, MN (US); Muhammad Jamal Afridi, Woodbury, MN (US); Himanshu Nayar, St. Paul, MN (US); Golshan Golnari, Maple Grove, MN (US)

(73) Assignee: 3M Innovative Properties Company, St. Paul, MN (US)

(*) Notice: Subject to any disclaimer, the term of this patent is extended or adjusted under 35 U.S.C. 154(b) by 346 days.

(21) Appl. No.: 17/247,773

(22) PCT Filed: Jun. 26, 2019

(86) PCT No.: PCT/IB2019/055385
§ 371 (c)(1),
(2) Date: Dec. 22, 2020

(87) PCT Pub. No.: WO2020/003150
PCT Pub. Date: Jan. 2, 2020

(65) Prior Publication Data
US 2021/0327041 A1    Oct. 21, 2021

Related U.S. Application Data

(60) Provisional application No. 62/691,330, filed on Jun. 28, 2018.

(51) Int. Cl.
*G07D 7/206* (2016.01)
*G06T 7/00* (2017.01)
(Continued)

(52) U.S. Cl.
CPC .......... *G07D 7/206* (2017.05); *G06F 18/214* (2023.01); *G06F 18/2135* (2023.01);
(Continued)

(58) Field of Classification Search
None
See application file for complete search history.

(56) References Cited

U.S. PATENT DOCUMENTS 7,495,214 B2   2/2009  Pan
7,706,700 B2   4/2010  Pan
(Continued)

FOREIGN PATENT DOCUMENTS

CN    201697894      1/2011
CN    102037676 A    4/2011
(Continued)

OTHER PUBLICATIONS

Chen, "One-Class SVM for Learning in Image Retrieval", Proceedings 2001 International Conference on Image Processing—Thessaloniki, Greece, (Cat. No. 01CH37205), Oct. 2001, pp. 34-37.
(Continued)

*Primary Examiner* — Leon Flores
(74) *Attorney, Agent, or Firm* — Sriram Srinivasan; Yufeng Dong

(57) ABSTRACT

Systems and methods for detecting/identifying novel material samples are provided. A test sample image is processed with a trained transformation function to obtain a transformed matrix. A measure of similarity of the test image based on the transformed matrix is compared to a threshold to determine whether the test sample is novel to a batch of material samples that are provided to train the transformation function.

19 Claims, 9 Drawing Sheets

(51) Int. Cl.
*G06F 18/22* (2023.01)
*G06F 18/214* (2023.01)
*G06F 18/2135* (2023.01)
*G06F 18/2411* (2023.01)
*G06V 10/82* (2022.01)

(52) U.S. Cl.
CPC .......... *G06F 18/22* (2023.01); *G06F 18/2411* (2023.01); *G06T 7/0002* (2013.01); *G06V 10/82* (2022.01); *G06T 2200/24* (2013.01); *G06T 2207/20081* (2013.01); *G06T 2207/20084* (2013.01)

(56) References Cited

U.S. PATENT DOCUMENTS

| | | | |
|---|---|---|---|
| 7,715,733 | B2 | 5/2010 | Pan |
| 2004/0197535 | A1 | 10/2004 | Bleckmann |
| 2010/0111445 | A1 | 5/2010 | Yang |
| 2014/0201094 | A1 | 7/2014 | Herrington |
| 2016/0110630 | A1 | 4/2016 | Heusch |
| 2017/0032285 | A1 | 2/2017 | Sharma |
| 2017/0076224 | A1* | 3/2017 | Munawar ............... G06N 3/045 |
| 2017/0363772 | A1 | 12/2017 | Sabelli |

FOREIGN PATENT DOCUMENTS

| | | |
|---|---|---|
| CN | 106997590 A | 8/2017 |
| EP | 1324283 A | 7/2003 |
| GB | 2253697 | 9/1992 |
| KR | 20120084944 A | 7/2012 |
| KR | 20130035849 A | 4/2013 |
| WO | WO 2001-013323 | 2/2001 |
| WO | WO 2007-126891 | 11/2007 |
| WO | WO 2012-099435 | 7/2012 |
| WO | 2017123555 A1 | 7/2017 |
| WO | WO 2018-178822 | 10/2018 |
| WO | WO 2019-106474 | 6/2019 |

OTHER PUBLICATIONS

Yamanaka, "Fast and Accurate Image Super Resolution by Deep CNN with Skip Connection and Network in Network." In: Cornell University Library/ Computer Science/Computer Vision and Pattern Recognition, Jul. 2017, 8 pages.

Schölkopf, "Support Vector Method for Novelty Detection", NIPS'99: Proceedings of the 12th International Conference on Neural Information Processing Systems, Denver, Colorado, USA, Nov. 1999, pp. 582-588.

International Search Report for PCT International Application No. PCT/IB2019/055385, dated Feb. 27, 2020, 2 pages.

* cited by examiner

IMAGE BASED NOVELTY DETECTION OF MATERIAL SAMPLES

CROSS REFERENCE TO RELATED APPLICATIONS

This application is a national stage filing under 35 U.S.C. 371 of PCT/IB2019/055385, filed Jun. 26, 2019, which claims the benefit of U.S. Application No. 62/691,330, filed Jun. 28, 2018, the disclosure of which is incorporated by reference in its/their entirety herein.

TECHNICAL FIELD

The present disclosure relates to methods and systems for novelty detection based on images of material samples.

BACKGROUND

Counterfeiting is a global problem. Various systems and methods for authenticating goods, products, or materials are described. U.S. Patent Application Publication No. 20040197535, U.S. Pat. Nos. 7,495,214, 7,706,700, and 7,715,733 describe various techniques to address counterfeiting and authenticate goods, products, or materials.

SUMMARY

There is a desire to authenticate materials, goods, or products in an efficient, and cost-effective way. Typically, when a product or sample is suspected to be counterfeit, it is shipped to the provider, and eventually makes its way to a technical expert who inspects the product under specific laboratory tests to determine whether it is counterfeit. Such a process of identifying counterfeits can be very time-consuming. The present disclosure provides methods and systems for novelty detection based on images of material samples. The methods and systems described herein can determine, based on images of a test sample and a batch of material samples (e.g., authentic/genuine material samples), whether the test sample is novel to the batch of material samples.

Briefly, in one aspect, the present disclosure describes a computer-implemented method of anomalous product identification. The method includes providing a test image of a test sample as an input to a trained transformation function associated with a processor. The trained transformation function is obtained by training a transformation function with training images of a batch of material samples. The method further includes processing, via the processor, the test image with the trained transformation function to obtain a transformed matrix, and comparing a measure of similarity of the test image based on the transformed matrix to a threshold to determine whether the test sample is novel to the batch of material samples. The measure of similarity is computed, via the processor, between the transformed matrix and an optional reference matrix. In some embodiments, the reference matrix originates from the test image without being processed by the trained transformation function. In some embodiments, all the training images are obtained from a batch of authentic/genuine material samples.

In another aspect, the present disclosure describes a system of detecting anomalous product. The system includes a graphical user interface (GUI) provided to a mobile device, the mobile device being capable of obtaining, via the GUI, one or more test images for a test material sample; a computation component functionally connected to the mobile device, configured to receive the test images from the GUI, and process the images; and a trained transformation function associated with the computation component, the trained transformation function when executed by the computation component, to transform the images to a transformed matrix, and return a result of evaluation of the transformed matrix to the GUI of the mobile device.

Various unexpected results and advantages are obtained in exemplary embodiments of the disclosure. One such advantage of exemplary embodiments of the present disclosure is that proactive identifications can be obtained without observing counterfeits where a transformation function can be trained without using data from counterfeits. Sufficient data from authentic/genuine samples can be provided to train the transformation function to provide reliable, proactive anomalous product identifications.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
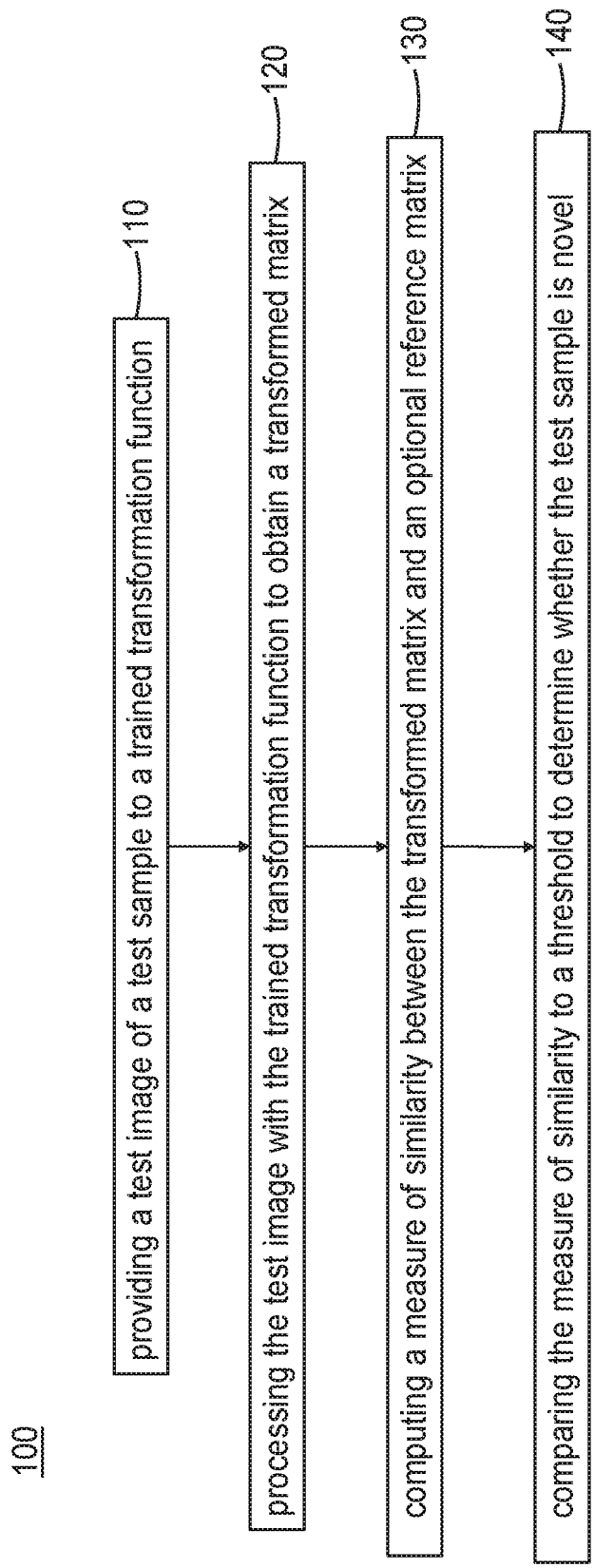
FIG. 1 is a flow diagram of a method for detecting novel material samples, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

In a multitude of industries and applications, there is a desire to authenticate materials, goods, or products in an efficient, and cost-effective way. Typically, when a product is suspected to be counterfeit, it is shipped to the provider, and eventually makes its way to a technical expert who inspects the product under specific laboratory tests to determine whether it is counterfeit. Such process of identifying counterfeits can be very time-consuming. The present disclosure provides methods and systems of anomalous product identification. The methods and systems described herein can determine, based on images of a test sample and a batch of material samples (e.g., authentic/genuine material samples), whether the test sample is novel to the batch of material samples.

FIG. 1 illustrates a computer-implemented method 100 for detecting/identifying anomalous product, according to one embodiment. At 110, one or more digital images for a test sample are provided to a trained transformation function associated with a processor. The digital images can be captured by any suitable instrument such as, for example, a digital camera incorporated into a mobile device such as a mobile phone. The digital images can include an RGB image, a thermal image, an infrared (IR) image, an ultraviolet (UV) image, etc. The size of the captured image may be, for example, about 200×200 pixels to about 10,000×10,000 pixels. The captured image can be in any suitable format such as, for example, JPEG, Exif, TIFF, BMP, GIF, PNG, etc.

The trained transformation function can be obtained by training a transformation function using training images of a batch of material samples. In some embodiments, all the training images are obtained from authentic/genuine material samples. That is, the transformation function can be trained without using data from counterfeits or novel material samples. In some embodiments, the set of material samples each may belong to a batch of material samples that contain substantially the same material configurations and/or are produced by substantially the same processes. In some embodiments, the material samples can be selected from, for example, abrasives, optical films, nonwovens, and products made therefrom, which are commercially available from 3M Company, Saint Paul, Minn., or counterfeits thereof. One typical material sample is respirators (e.g., molded respirators or flat-fold respirators) including nonwoven materials. The trained transformation function is associated with a computer processor. When executed by the processor, the trained transformation function can process an input image (e.g., a test image of material sample) and transform the input image to a matrix. The matrix can be in form of, for example, a transformed image, a transformed matrix, a transformed vector, a scalar number, etc. The transformation function can include, for example, a one class support vector machine (SVM) algorithm, a projection based reconstruction algorithm, an auto-encoder based reconstruction algorithm, a convolutional neural network (CNN) algorithm, etc. The method 100 then proceeds to 120.

At 120, the test image of the test sample is processed with the trained transformation function, via the processor, to obtain a transformed matrix. When executed by the processor, the trained transformation function can process an input image (e.g., a test image of material sample) and transform the input image to a matrix. The matrix can be in a form of, for example, a transformed image, a transformed matrix, a transformed vector, a reconstructed image, a scalar number, etc. The transformation function can include, for example, a one class support vector machine (SVM) algorithm, a projection based reconstruction algorithm, an auto-encoder based reconstruction algorithm, a convolutional neural network (CNN) algorithm.

In some embodiments, the images can be first processed to extract computer-vision features representing a material property of the material sample, for example, a texture of a respirator material (e.g., a nonwoven material). The characteristic features of a material sample may include, for example, an optical feature (e.g., intensity, color, etc.), a surface pattern feature, an acoustical feature (e.g., frequency absorption), an elastic feature (e.g., modulus), a structural feature (e.g., shape), an electronic feature (e.g., resistance), a magnetic feature (e.g., field strength), an electrets related feature (e.g., dielectric), a mechanical feature (e.g., yield strength), etc. The method 100 then proceeds to 130.

At 130, a measure of similarity is computed between the transformed matrix and an optional reference matrix. The transformed matrix is obtained at 120 by transforming the test image. In some embodiments, the reference matrix may originate from the test image without being processed by the trained transformation function. In some embodiments, the reference matrix can be, for example, the original test image. In some embodiments, the reference matrix can be, for example, a feature matrix/vector obtained by extracting computer-vision features from the original test image. In some embodiments, the measure of similarity is computed as a reconstruction error which is determined when processing the test image with the transformation function to the transformed matrix. In some embodiments, the measure of similarity can be directly computed for an input image with the transformation function, without referring to a reference matrix. In some embodiments, the measure of similarity may be in the form of a scalar number. The method 100 then proceeds to 140.

At 140, the measure of similarity is compared to a threshold to determine whether the test sample is novel to a batch of identified material samples (e.g., authentic samples). If the test sample is novel to the batch of identified materials (e.g., authentic samples), then the test sample may be counterfeit or a new sample to be identified. If the test sample is not novel to the batch of identified materials (e.g., authentic sample), then the test sample may be determined to be authentic. In some embodiments, the threshold can be computed, via the processor, from reconstruction errors of validation images by processing the validation images with the trained transformation function. In some embodiments, the validation images can include some or all of the training images provided to train the transformation function. In some embodiments, the validation images and the training images may belong to the same batch of material samples, but the validation images are not provided to train the transformation function. In some embodiments, about 50% or more, about 70% or more, about 90% or more, or about 95% or more of the validation images are obtained from authentic/genuine material samples. In some embodiments, the threshold can be a fixed scalar number, for example, zero. When the measure of similarity is greater than the threshold, the method can determine that the test sample is novel to the batch of identified materials; when the measure of similarity is not greater than the threshold, the method can determine that the test sample is not novel to the batch of identified materials.

Figure 2:
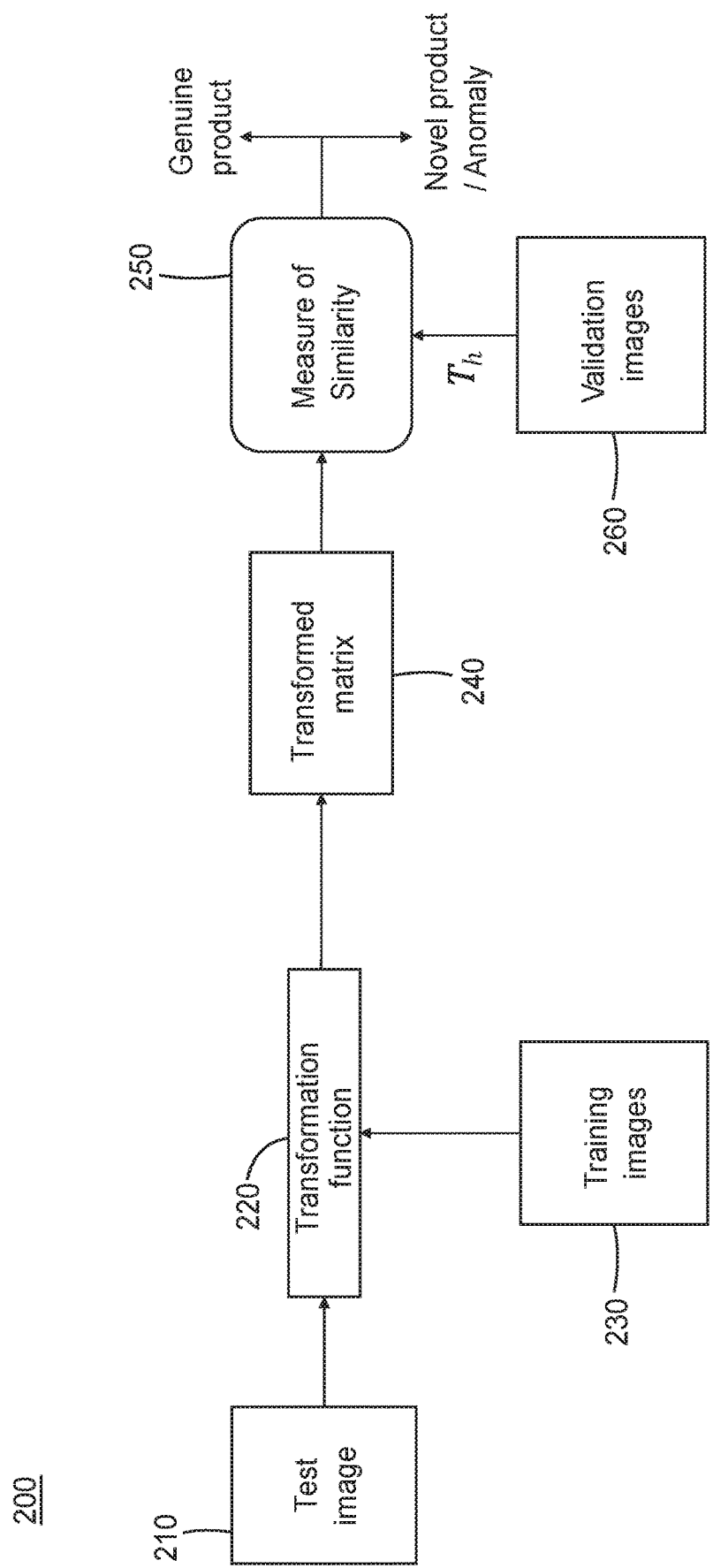
FIG. 2 is a block diagram of a method for detecting novel material samples, according to some embodiments.

FIG. 2 is a block diagram of a method 200 for detecting novel material samples, according to some embodiments. At 210, one or more test images of a test sample is provided as an input to a trained transformation function 220 associated with a processor. The transformation function 220 is trained by using training images 230 (e.g., images of a batch of material samples). The method 200 can determine whether the test sample is novel to the batch of material samples.

The transformation function 220 can include computing algorithms stored in a memory that when executed by a computer processor, to process one or more test images, to obtain a transformed matrix at 240. The transformation function 220 can include various computing algorithms. Some embodiments of the computing algorithms are shown in FIGS. 3-7 and will be further described below. The computing algorithms can be trained by using the training images 230. The output of the training can be a trained transformation function. Using the training images, at least a portion of the transformation function can be optimized for a given problem. For example, images of a batch of authentic material samples (e.g., respirators) can be provided to train the transformation function to obtain a trained transformation function that is optimized for detecting whether a test material sample (e.g., an unknown respirator) is novel to that batch of authentic material samples.

In some embodiments, the training images 230 can be obtained from a batch of material samples that contain substantially the same material configurations and/or are produced by substantially the same processes. For example, the training images 230 can be captured by a camera (e.g., a smartphone) for a batch of material samples. The batch of material samples each can have been identified as authentic material samples. In some embodiments, the batch of material samples can be selected from, for example, abrasives, optical films, nonwovens, and products made therefrom, which are commercially available from 3M Company, Saint Paul, Minn., or counterfeits thereof. One typical material sample is respirators (e.g., molded respirators or flat-fold respirators) including nonwoven materials.

After the training, the trained/learned transformation function can take in the test image as an input and generate a transformed matrix as an output. In some embodiments, the transformed matrix may include a multidimensional vector. A scalar measure of similarity between the transformed matrix and an optional reference matrix can be computed, via the processor, at 250. The scalar measure of similarity in the output may then be evaluated against a threshold (Th) obtained as characteristics of validation images 260 to determine whether the test image is novel to the training images 230, e.g., genuine product or novel product/anomaly.

Figure 3:
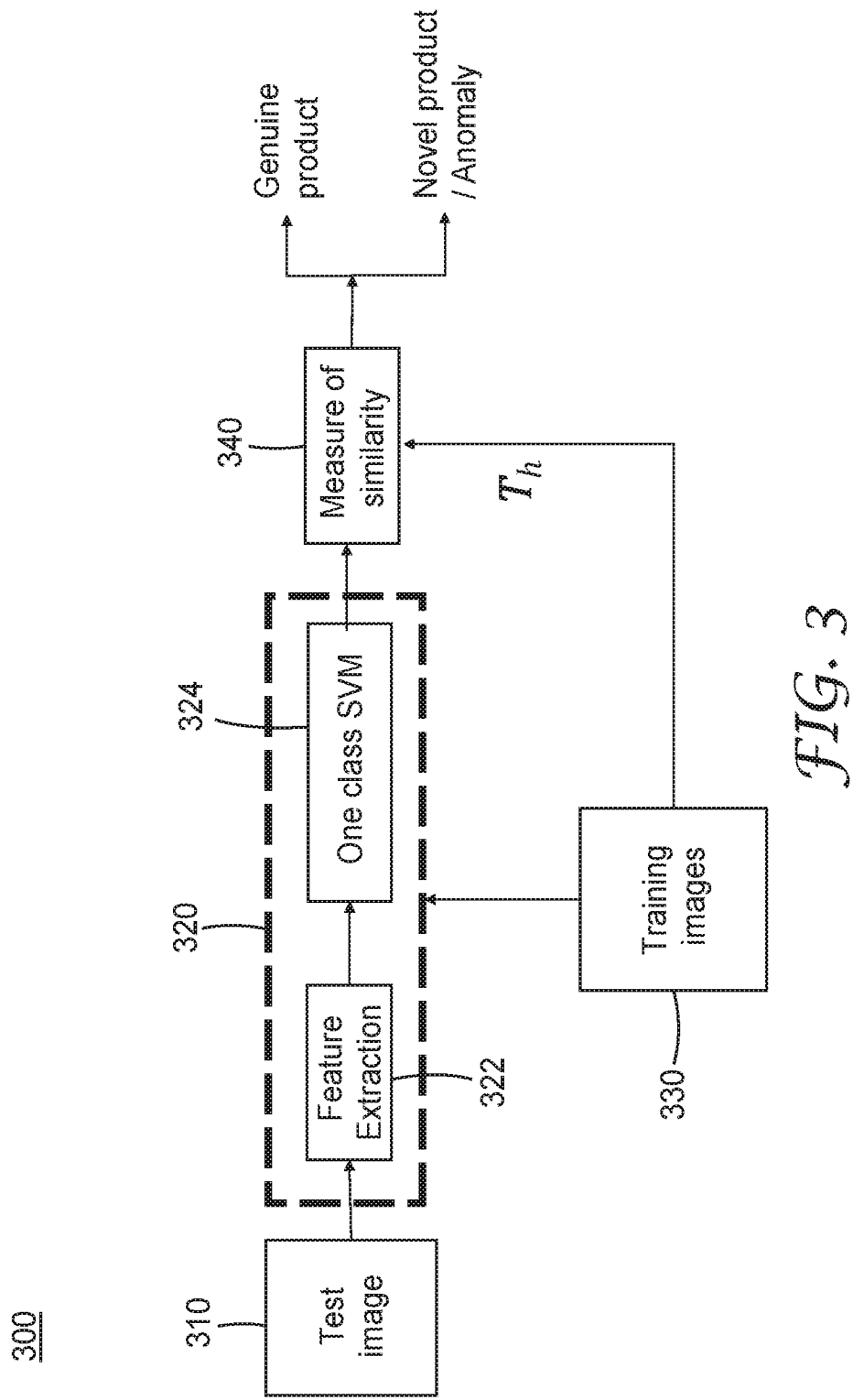
FIG. 3 is a block diagram of a method for detecting novel material samples where a transformation function includes a one class SVM algorithm, according to one embodiment.
Figure 5:
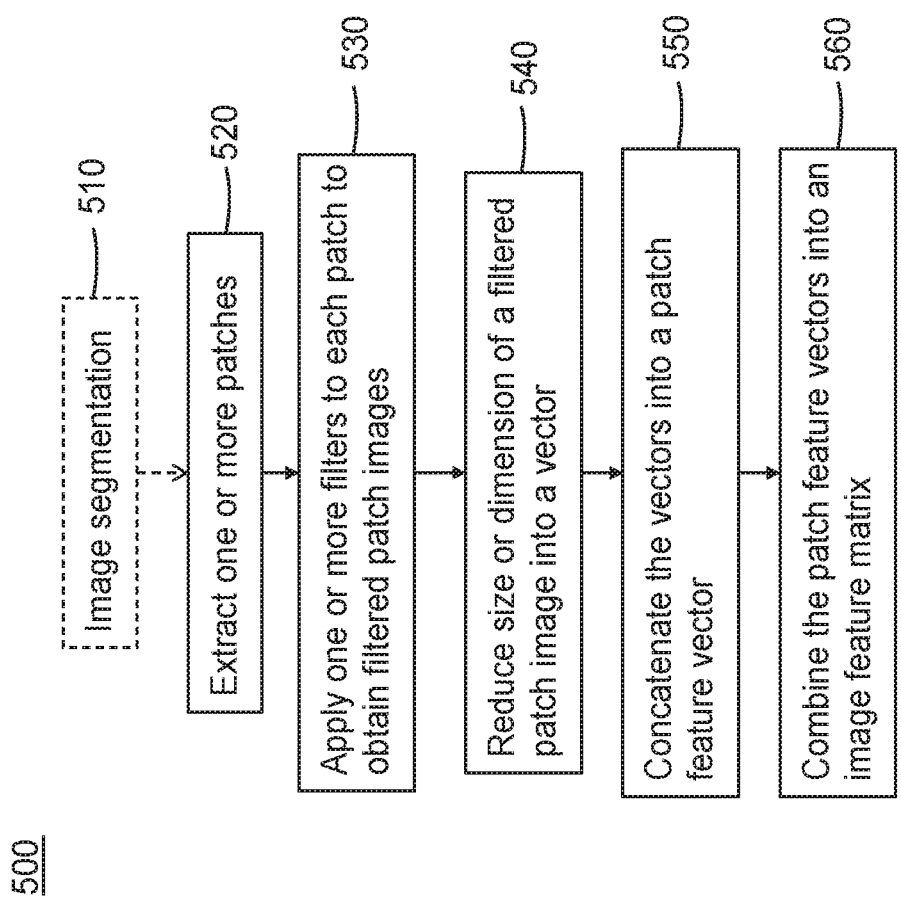
FIG. 5 is a flow diagram of a method for processing sample images, and optionally for labeling sample images, according to one embodiment.

FIG. 3 is a block diagram of a method 300 for detecting novel material samples using a transformation function 320 including a one class support vector machine (SVM) algorithm, according to one embodiment. The transformation function 320 includes a feature extraction component 322, and a one-class SVM component 324. The feature extraction component 322 can extract computer-vision features from an image (e.g., a test image, or a training image). In some embodiments, the feature extraction component 322 can convert a 2D image into a k-dimensional feature vector. FIG. 5 illustrates an exemplary process to extract computer-vision features from an image, and will be discussed further below.

For training images at 330, the feature extraction component 322 can process the training images to obtain the respective k-dimensional training feature vectors. A training database can include the computer-vision features extracted from the training images (e.g., k-dimensional training feature vectors). The training database can be provided to the one-class SVM component 324 to obtain a trained/learned SVM algorithm by learning a set of support vectors that define the decision boundary of the trained one-class SVM algorithm. Description of a typical one class SVM algorithm can be found in, for example, Chen et al., One-class SVM for learning in image retrieval, Image Processing, 2001. Proceedings 2001 International Conference on, vol.: 1, Oct. 7-10, 2001, pp. 34-37. In some embodiments, the training database may include data originated from images of only authentic material samples. That is, the transformation function can be trained only with training data from authentic material samples.

The test image is passed through the feature extraction component 322 and the output feature vector is passed to the train/learned SVM algorithm to obtain a measure of similarity at 340 which serves as both the transformed matrix 240 and the measure of similarity 250 of FIG. 2. In the embodiment of FIG. 3, the measure of similarity can be a 1×1 dimensional matrix, e.g., a scalar number. The measure of similarity from the test image can then be compared to a characteristic of the training data, e.g., a threshold Th which is determined to be zero in this embodiment of FIG. 3.

For the test image at 310, the measure of similarity can have a positive or a negative value, as compared to the threshold Th which has been determined to be zero. When the measure of similarity is positive, the test image can be determined to be novel to the training images; when the measure of similarity is negative, the test image and the training images can be determined to originate from the same batch of material samples.

Figure 4:
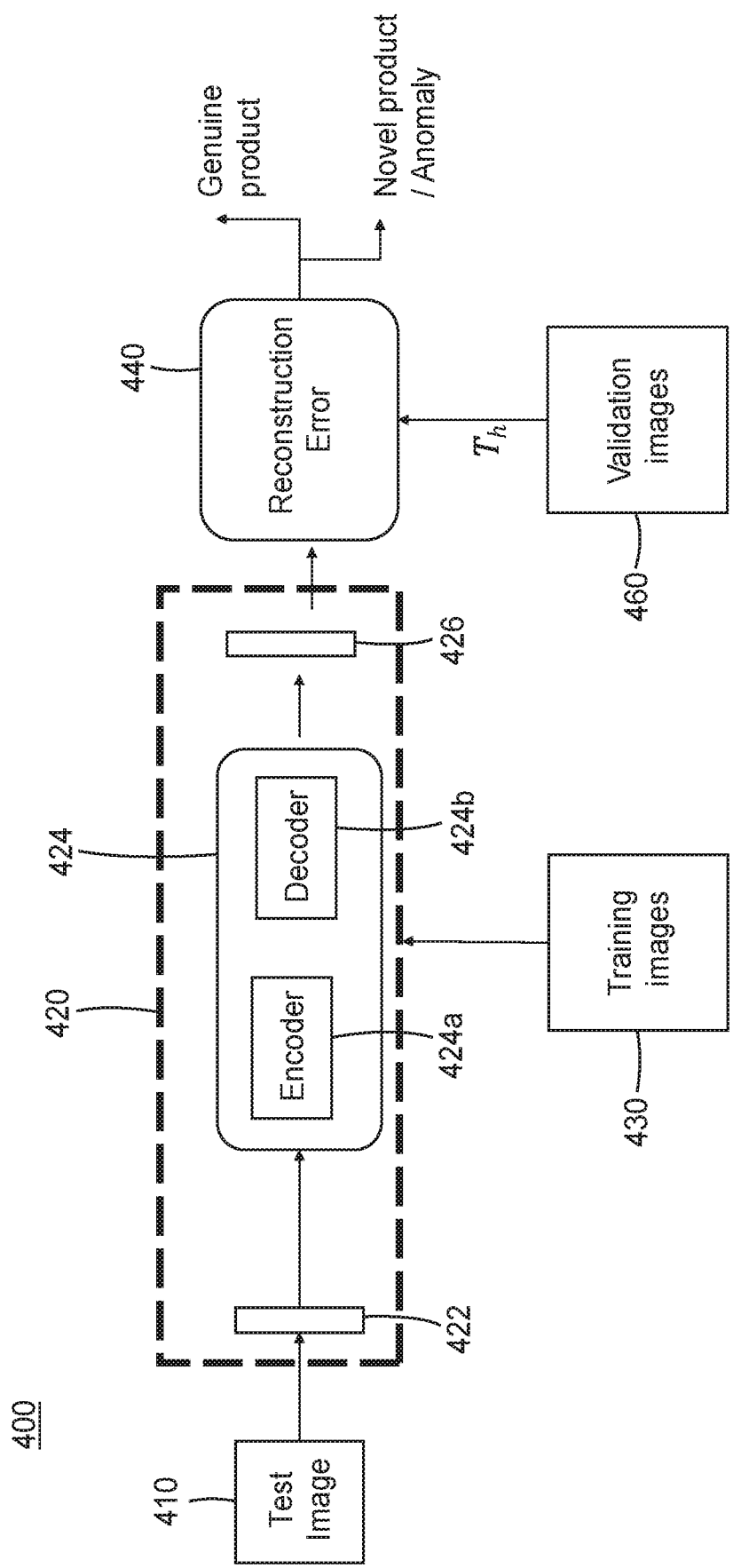
FIG. 4 is a block diagram of a method for detecting novel material samples where a transformation function includes a projection based reconstruction algorithm, according to one embodiment.

FIG. 4 is a block diagram of a method 400 for detecting novel material samples using a transformation function includes a projection based reconstruction algorithm, according to one embodiment. The transformation function 420 includes a feature extraction component 422 and a projection based reconstruction algorithm 424. The feature extraction component 422 can be the same as the feature extraction component 322 of FIG. 3 that can extract computer-vision features from an image (e.g., a test image, or a training image). In some embodiments, the feature extraction component 422 can convert a 2D image into a k-dimensional feature vector.

The projection based reconstruction algorithm 424 may include, for example, a principal component analysis (PCA), a robust PCA, a dictionary learning, an independent component analysis (ICA), a principal component pursuit (PCP), etc.

The projection based reconstruction algorithm 424 includes an encoder component 424a and a decoder component 424b. The output of the feature extraction component 422, e.g., a k-dimensional vector of computer vision features, can be provided to the encoder component 424a. For training images at 430, the output of training the encoder component 424a can be a learned k×m projection matrix from the computer vision features of the training images; and the output of training the decoder component 424b can be a learned m×k projection matrix from the computer vision features of the training images. In one embodiment, the encoder projection matrix may be obtained from the m singular vectors corresponding to the m largest singular values of the zero-meaned training database and the decoder projection matrix is the transpose of the encoder projection matrix. Here m is the rank (number of components) of the projection matrix and k>m, where m may be selected by visual inspection of a scree plot or via a statistical test.

The test image at 410 can be passed as input to the feature extraction component 422 to obtain a test feature vector. The obtained test feature vector is then passed as input to the encoder component 424a which transforms the feature vector into an m dimensional vector by applying the learned k×m projection matrix. That is, for a test image, the corresponding output of the encoder component 424a can be a m dimensional vector, by applying the learned k×m projection matrix. In some embodiments, when $x \in \mathbb{R}^{\wedge}(k \times 1)$ is an input feature vector for the feature extraction component 422, and $P \in \mathbb{R}^{\wedge}(k \times m)$ is the learned projection matrix, then the output of the encoding is $y = P^{\wedge}T\ x \in \mathbb{R}^{\wedge}(m \times 1)$.

The output of the encoder component 424a can be provided as an input to the decoder component 424b which can decode the input and obtain a transformed matrix, in the embodiment of FIG. 4, as a reconstructed computer vision feature vector at 426. In some embodiments, the decoder component 424b can use the learned m×k projection matrix to decode the encoding output to a k-dimensional vector via $z = Py \in \mathbb{R}^{\wedge}(k \times 1)$, where z is a reconstructed computer vision feature vector of the test image at 410.

For a test image at 410, a reconstruction error 440 can be determined as a measure of similarity for the reconstructed computer vision feature vector at 426 by comparing the reconstructed computer vision feature vector against a reference vector/image, e.g., the k-dimensional vector of computer vision feature obtained at 422. In some embodiments, the reconstruction error can be determined by calculating a weighted $L^{\wedge}p$ norm between x and z such as, for example, an Euclidean distance via the equation $error = \|x - z\|_2$, where x is an input feature vector for the feature extraction component 422, and z is a reconstructed computer vision feature vector. Other norms/distances may also be used for calculating the reconstruction error such as, for example, Schatten p-norms for any non-negative value of p. It is to be understood that such a reconstruction error can be calculated at 440 in the same manner for any digital images that pass into the trained transformation function 420.

The reconstruction error obtained for the test image can be compared to a threshold Th to determine whether the test image 410 is novel to the training images 430. The threshold is computed, via the processor, from reconstruction errors of validation images by processing the validation images at 460 with the trained transformation function. In some embodiments, some or all of the training images 430 can used as the validation images at 460. The threshold Th can be determined based on a certain desired false alarm rate when reconstructing computer vision features for the validation images at 460. Given the validation images at 460 and their corresponding reconstruction errors, different threshold values can be determined. For example, when 1000 validation images are provided, 1000 reconstruction error values can be calculated respectively. A threshold value Th can be determined based on the distribution of the 1000 reconstruction error values. One exemplary strategy can be, threshold=mean error value+1×standard deviation or threshold=mean error value+2×standard deviation, where the mean value and the standard deviation are determined from the distribution. Another strategy can be to set the threshold at a certain percentile of the distribution, which can typically be determined by an expert. When the reconstruction error 440 is greater than the threshold Th, the test sample can be determined as novel to the batch of material samples; when the reconstruction error 440 is less than the threshold Th, then the test sample can be determined as authentic/genuine.

The validation images can be passed into the trained transformation function 420 and their corresponding reconstruction errors can be determined at 440. In some embodiments, validation images and training images may belong to the same batch of material samples, but the validation images are not provided to train the transformation function. In some embodiments, validation images may be a combination of a first set of images used for training, and a second set of images not used for training, where both sets belong to the same batch of material samples. In some embodiments, a classification accuracy obtained for the various images can be used to adjust the threshold.

FIG. 5 illustrates a flow diagram of a method 500 for processing sample images, according to one embodiment. At optional 510, a digital image of a material sample can be segmented. The optional step of image segmentation can separate the object (e.g., a material sample such as a respirator) from the background in the image. In some embodiments, the image segmentation can be accomplished by, for example, thresholding the image in a LAB space when the object is different from the background by colors, contrast, etc. The image segmentation may also help to clean up edge regions and impurities (e.g., holes) in the image. In general, the optional step 510 of image segmentation can help to better identify the pixels in the image that belong to the object. The method 500 then proceeds to 520.

At 520, one or more patches are extracted from the sample image. The patches can be extracted by sampling image pixels in any suitable manner, for example, random sampling, uniform sampling, or other intelligent sampling approaches. The number/of patches may be, for example, from one to 10,000. Typical numbers may be around several tens to several thousands. The patches may have a polygon shape (e.g., a square shape, a triangular shape, a hexagonal shape, etc.) with a patch size, for example, from 1×1 pixel to 1000×1000 pixels. It is to be understood that the suitable number of patches, the suitable patch shape, and the suitable patch size may depend on properties of the sample images (e.g., size, resolution, shape, quality, etc.). The method 500 then proceeds to 530.

At 530, one or more filters are applied to each patch to obtain one or more filtered patch images per patch. In some embodiments, each patch can be passed through a series of filters such as, for example, a Gabor filter. The filters are used to extract information related to material properties of the samples. For example, Gabor filters can be used to extract texture information of a non-woven material. The series of filters can have a series of respective parameters, when applied to a patch, resulting in a series of filtered patch images. That is, a number m of filters can be applied to a patch to generate a number m of filtered patch images, where m is an integer (e.g., 8, 16, 32, etc.). For example, the Gabor filters can be applied with a series of kernels (e.g., 16 kernels from 0 to 15), which can result in a series of filtered images (e.g., 16 filtered images) for each patch.

It is to be understood that any suitable digital filters can be used to extract information related to suitable material properties. Suitable digital filters may include, for example, Fourier transforms (for extracting frequency properties), Laplace transform (for extracting frequency properties), Gaussian filters (for extracting texture properties), high-pass filters (for extracting high-frequency components), low-pass filters (for extracting smooth features), band-pass filters (for extracting specific frequency components), median filters (for extracting noise reduction), averaging filters (for extracting noise reduction), Local Binary Patterns (for extracting texture), Laplacian of Gaussian (for extracting edge properties), Sobel filters (for extracting edge properties), Prewitt filters (for extracting edge properties), amongst many others.

In some embodiments, multiple sets of digital filers can be applied, simultaneously or sequentially, to each patch. In some embodiments, a first set of filters (e.g., a series of Gabor filters) can be applied to each patch to obtained filtered patch images; a second filter (e.g., a local binary pattern (LBP) filter) can be applied to each filtered patch image to transfer the filtered patch image into a further filtered patch image (e.g., an LBP image). The algorithm of an LBP filter examines each pixel in a patch image and, for each pixel, examines the 8 neighboring pixels. If a neighboring pixel is larger than the target pixel, it receives a '1'; if neighboring pixel is smaller than the target pixel, it receives a '0'. These eight bits are then concatenated to form an 8-bit sequence, which takes a value between 0 and 255. In this manner, the filtered patch image can be transformed into a LBP patch image with values between 0 and 255 or a "uniform" LBP patch image with values between 0 and 9. After obtaining the filtered patch images for each patch, the method 500 then proceeds to 540.

At 540, the size or dimension of each filtered patch image is reduced. While the filtered patch images can effectively show material properties (e.g., texture) of the patches, the resulting computer-vision related data of a sample image can be big, considering the large number of patches (e.g., 1000 patches or more), the number m (e.g., 16 or more) of the filters applied to each patch, the size of each filtered patch image (e.g., 101×101 pixels), etc. This step can effectively reduce the size of the computer-vision related data by reducing the size or dimension of the filtered patch images for each patch.

In some embodiments, the size or dimension of the filtered patch images can be reduced by vectorizing the images. In some embodiments, a filtered patch image can be converted or transformed into an n-dimensional histogram, and further into an n-dimensional vector, where n can be any suitable integer (e.g., from 1 to 256). In some embodiments, the mean and variance of a filtered patch images can be concatenated to the end of the corresponding histogram, resulting in a 12-dimensional vector per filtered patch image (e.g., per kernel). It is to be understood that any suitable vectorizing methods can be used to transform a filtered patch image into an n-dimensional vector. The method 500 then proceeds to 550.

At 550, the computer-vision data related to the filtered patch images are combined for each patch. As described in 530 and 540, in some embodiments, for each patch, a number m of filtered patch images can be obtained with varying parameters (e.g., m kernels); for each filtered patch image, an n-dimensional vector can be obtained. The n-dimensional vectors for the m filtered patch images can be concatenated to form a d-dimensional patch feature vector $x_{patch}$ for each patch, where d=(m×n). For example, for the Gabor filters applied with a series of kernels (e.g., 16 kernels from 0 to 15 corresponding to 16 filtered images), the 12-dimensional vectors of the 16 filtered images can be concatenated to form a final feature vector $x_{patch}$ for the patch, e.g., a 192 (12×16) dimensional feature vector as represented below:

$$x_{patch} = \begin{bmatrix} x_0 \\ \vdots \\ x_{15} \end{bmatrix}, x_1 = \begin{bmatrix} lbp_0 \\ \vdots \\ lbp_q \\ kern_{mean} \\ kern_{var} \end{bmatrix} \quad (1)$$

The above process for combining filtered patch images can be repeated for each patch to obtain a number/of such d-dimensional patch feature vectors for each image, where/ is the total number of patches extracted from a sample image, and d=(m×n) is the dimension of a patch feature vector $x_{patch}$.

At 560, the computer-vision data for the patches are combined for each image. For an image having/patches, the number/of such d-dimensional patch feature vectors $x_{patch}$ can be combined to form an (l×d) matrix of feature vectors. The matrices for all the images can be further combined to form a (k×l)×d matrix of feature vectors, where k is the total number of sample images.

Figure 6:
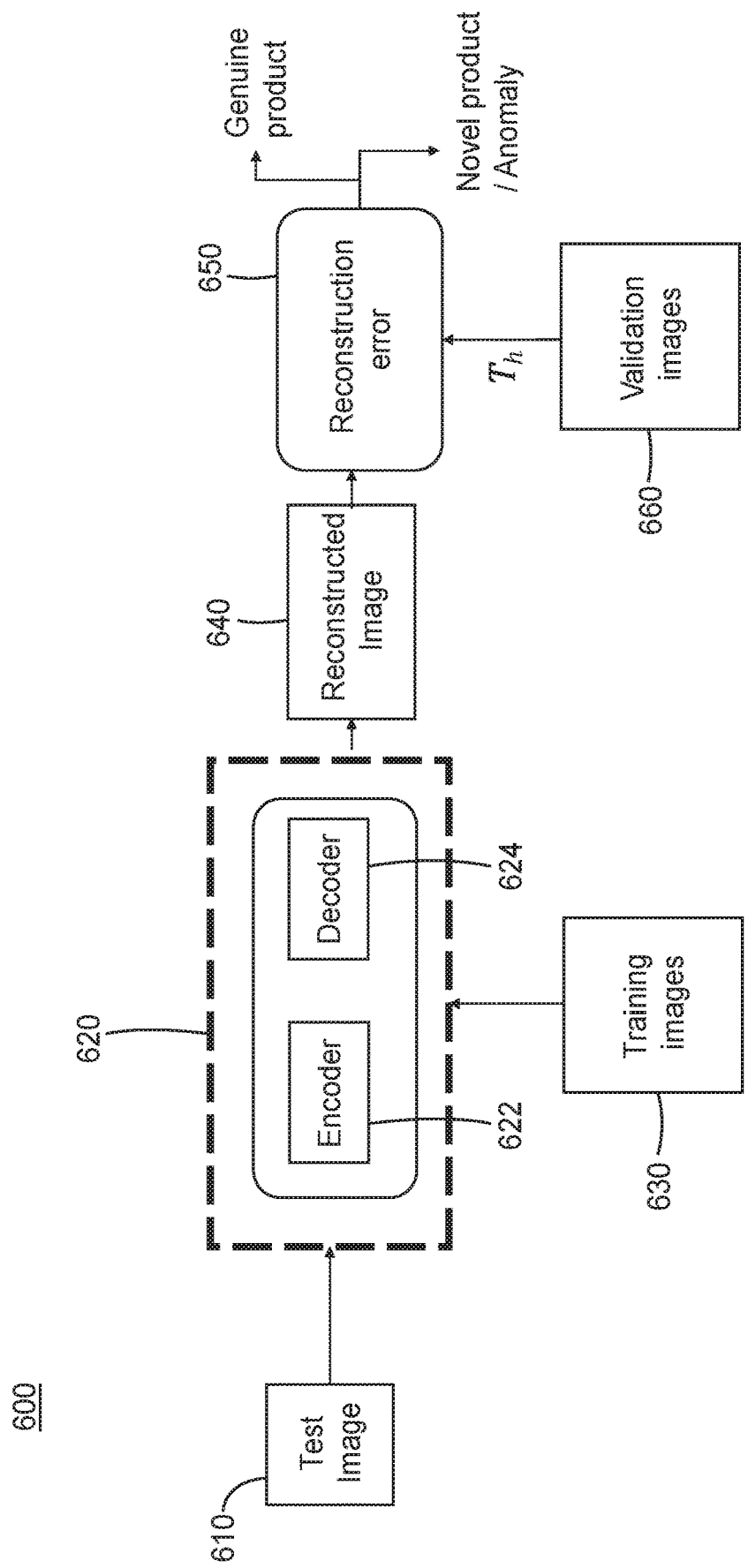
FIG. 6 is a block diagram of a method for detecting novel material samples where a transformation function includes an auto-encoder based reconstruction algorithm, according to one embodiment.

FIG. 6 is a block diagram of a method 600 for detecting novel material samples using a transformation function including an auto-encoder based reconstruction algorithm, according to one embodiment. The transformation function 620 includes an encoder component 622 and a decoder component 624.

An image can be directly provided to the encoder component 622 where the encoding is performed with a neural network. The neural network of the encoder component 622 may have multiple layers where each layer transforms the input of the previous layer and then passes the output to the next layer. The output of the encoder component 622 can be a k-dimensional feature vector. This feature vector can then be passed as input to the decoder component 624. The decoder component 624 can also be performed using a neural network which may have multiple layers where each layer transforms the input of the previous layer and then passes the output to the next layer. The output of the decoder component 624 can be an image which may have the same size as the input image to the encoder component 622.

The neural network can be first trained by the training images 630. The neural networks of the encoder component 622 and the decoder component 624 can be simultaneously trained by using the training images 630. The weights of each neural network can be learned by using, for example, gradient descent and back propagation.

A test image 610 can be provided as input to the trained encoder component 622 which produces a k-dimensional feature vector. This feature vector is then provided as input to the trained decoder component 624 which produces a reconstructed image 640 which may have the same size as the test image 610. That is, the trained transformation function 620 can process the test image 610 to obtain a transformed matrix, e.g., a reconstructed image 640 in this embodiment.

For the input image, the output of the encoder component 622 can be non-linear combination(s) of computer vision features of the training images 630. A reconstruction error can be determined at 650 as a measure of similarity for the reconstructed image 640 by comparing the reconstructed image against a reference image (e.g., the test image at 610 or its equivalent in the form of a matrix). In the embodiment of FIG. 6, the reference image/matrix can be an input image provided to the transformation function 620, which can be, for example, a test image at 610, a training image at 630, or other types of input images/matrix.

In some embodiments, the reconstruction error can be determined by calculating some error metric such as error=$\|X-Z\|_F$, where X and Z are the input and output for the transformation function 620 (e.g., an input image and the corresponding reconstructed image, respectively), and the norm can be the Frobenius norm. Other norms such as, for example, Schatten p-norms for any non-negative value of p, may also be used for calculating the reconstruction error. It is to be understood that such a reconstruction error can be calculated at 650 in the same manner for any digital images that pass into the trained transformation function 620.

The reconstruction error obtained for the test image can be compared to a threshold Th to determine whether the test image 610 is novel to the training images 630. The threshold is computed, via the processor, from reconstruction errors of validation images by processing the validation images at 660 with the trained transformation function. In some embodiments, some or all of the training images 630 can used as the validation images at 660. The threshold Th can be determined based on a certain desired false alarm rate when reconstructing computer vision features for the validation images at 660. Given the validation images at 660 and their corresponding reconstruction errors, different threshold values can be determined. For example, when 1000 validation images are provided, 1000 reconstruction error values can be calculated respectively. A threshold value Th can be determined based on the distribution of the 1000 reconstruction error values. One exemplary strategy can be, threshold=mean error value+1×standard deviation or threshold=mean error value+2×standard deviation, where the mean value and the standard deviation are determined from the distribution. Another strategy can be to set the threshold at a certain percentile of the distribution, which can typically be determined by an expert. When the reconstruction error 640 is greater than the threshold Th, the test sample can be determined as novel to the batch of material samples; when the reconstruction error 640 is less than the threshold Th, then the test sample can be determined as authentic/genuine.

The validation images can be passed into the trained transformation function 620 and their corresponding reconstruction errors can be determined at 640. In some embodiments, validation images and training images may belong to the same batch of material samples, but the validation images are not provided to train the transformation function. In some embodiments, validation images may be a combination of a first set of images used for training, and a second set of images not used for training, where both sets belong to the same batch of material samples. In some embodiments, a classification accuracy obtained for the various images can be used to adjust the threshold.

Figure 7:
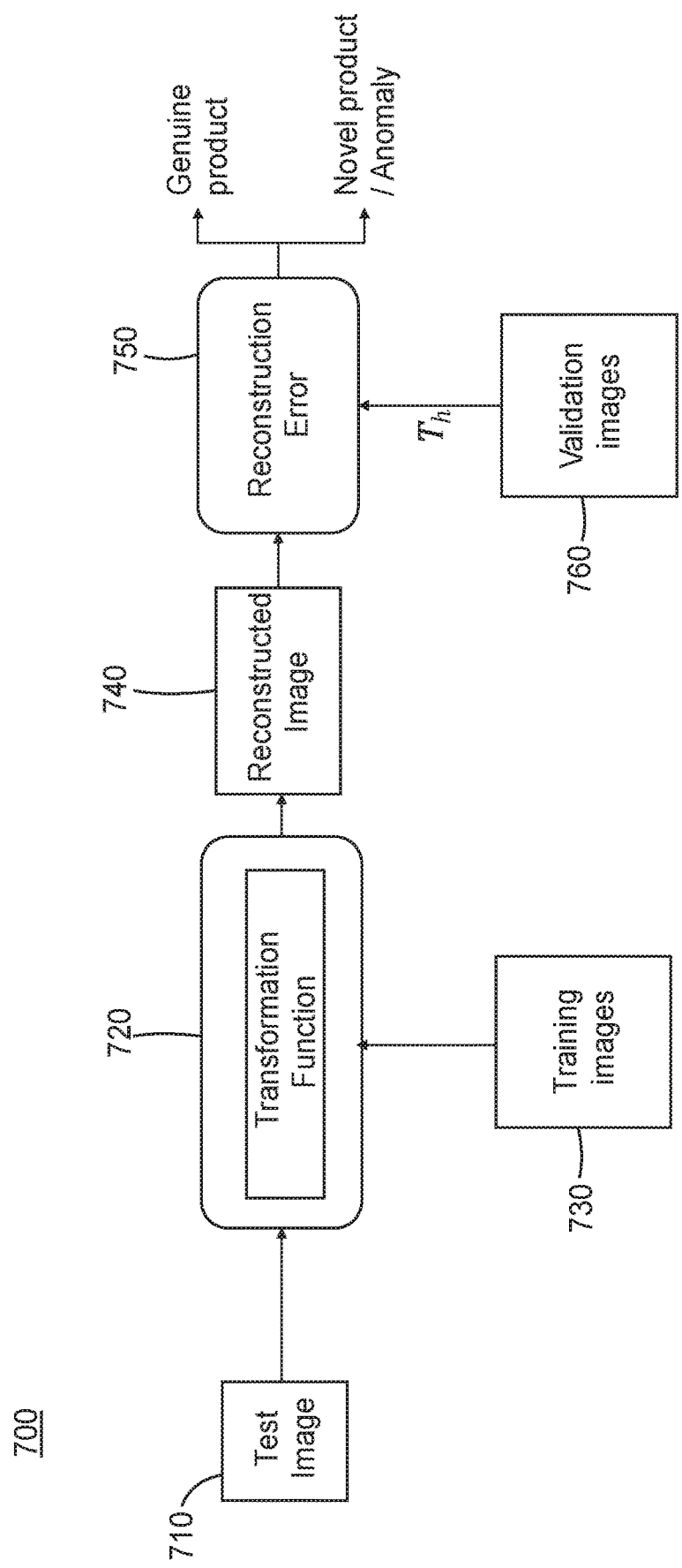
FIG. 7 is a block diagram of a method for detecting novel material samples where a transformation function includes a CNN algorithm, according to one embodiment.

FIG. 7 is a flow diagram of a method for detecting novel material samples where a transformation function includes a convolutional neural network (CNN) algorithm, according to one embodiment.

An image can be directly provided to the transformation function 720 where the image transformation is performed with a convolutional neural network (CNN). The CNN may have multiple layers where each layer transforms the input of the previous layer and then passes the output to the next layer. In some embodiments, the size of the input image may be reduced after it is transferred by the CNN. In some embodiments, the CNN can be used in a super-resolution style where the layers of neural network can produce transformed images that may have substantially the same size as the input image. Some CNN based approaches can achieve this by utilizing a standard padding technique at each convolutional layer to maintain the height and width of the feature maps across the layers. This result in reconstructed image (or matrix) that has the same width and height. This is different from the encoder/decoder combination at 620 of FIG. 6, where the image size is first reduced and then increased. When the CNN is used in the super-resolution style, the size of the images can be substantially the same throughout the layers, which is useful when the loss of information could be costly and small texture patterns are of importance.

The CNN can be trained by training images 730. The weights of each layer can be learned by using, for example, gradient descent and back propagation.

For a test image at 710, the CNN can transform the image through the layers (e.g., hidden layers) to obtain a reconstructed image at 740. That is, the trained transformation function 720 can process the test image 710 to obtain a transformed matrix, e.g., a reconstructed image 740 in this embodiment. A reconstruction error can be determined at 750 as a measure of similarity by comparing the reconstructed image against a reference image/matrix. In the embodiment of FIG. 7, the reference image/matrix can be the input image provided to the transformation function 720, which can be, for example, the test image at 710, a training image at 730, or other types of input images.

In some embodiments, the reconstruction error can be determined by calculating some error metric such as error=$\|X-Z\|_F$, where X and Z are the input and output for the transformation function 720 (e.g., an input image and the corresponding reconstructed image, respectively), and the norm can be the Frobenius norm. Other norms such as, for example, Schatten p-norms, may also be used for calculating the reconstruction error. It is to be understood that such reconstruction error can be calculated at 750 in the same manner for any digital images that pass into the trained transformation function 720.

The reconstruction error obtained for the test image can be compared to a threshold Th to determine whether the test image 710 is novel to the training images 730. The threshold is computed, via the processor, from reconstruction errors of validation images by processing the validation images at 760 with the trained transformation function. In some embodiments, some or all of the training images 730 can used as the validation images at 760. The threshold Th can be determined based on a certain desired false alarm rate when reconstructing computer vision features for the validation images at 760. Given the validation images at 760 and their corresponding reconstruction errors, different threshold values can be determined. For example, when 1000 validation images are provided, 1000 reconstruction error values can be calculated respectively. A threshold value Th can be determined based on the distribution of the 1000 reconstruction error values. One exemplary strategy can be, threshold=mean error value+1×standard deviation or threshold=mean error value+2×standard deviation, where the mean value and the standard deviation are determined from the distribution. Another strategy can be to set the threshold at a certain percentile of the distribution, which can typically be determined by an expert. When the reconstruction error 740 is greater than the threshold Th, the test sample can be determined as novel to the batch of material samples; when the reconstruction error 740 is less than the threshold Th, then the test sample can be determined as authentic/genuine.

The validation images can be passed into the trained transformation function 720 and their corresponding reconstruction errors can be determined at 740. In some embodiments, validation images and training images may belong to the same batch of material samples, but the validation images are not provided to train the transformation function. In some embodiments, validation images may be a combination of a first set of images used for training, and a second set of images not used for training, where both sets belong to the same batch of material samples. In some embodiments, a classification accuracy obtained for the various images can be used to adjust the threshold.

Figure 8:
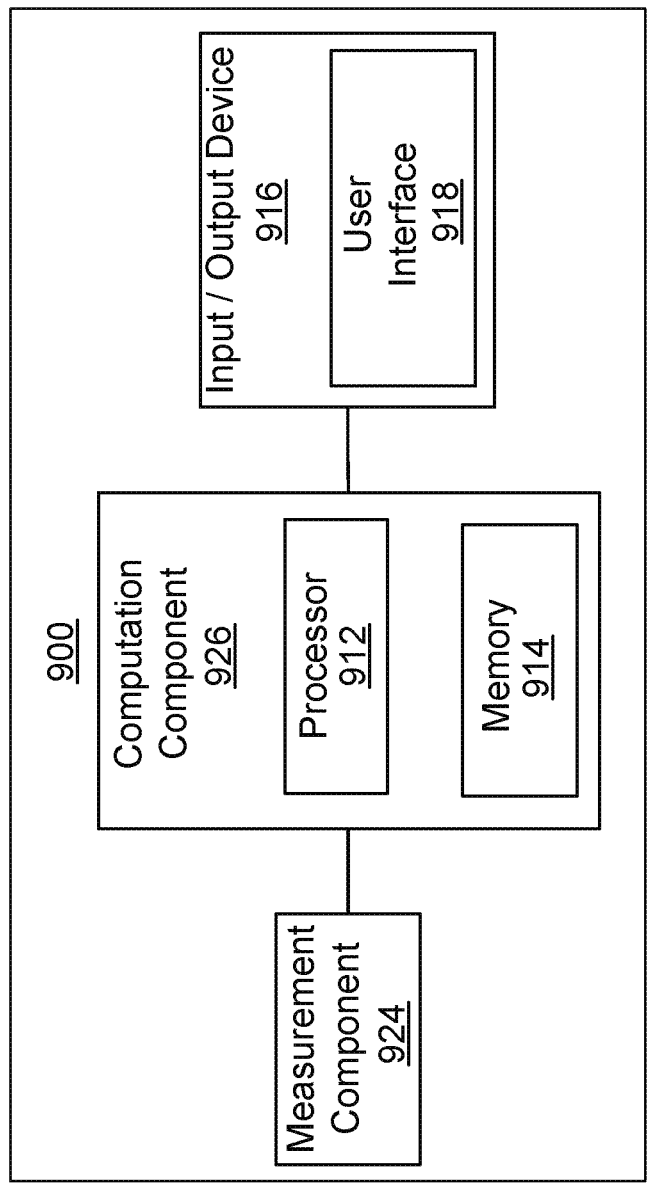
FIG. 8 illustrates a block diagram for a system of detecting anomalous product, according to one embodiment.

FIG. 8 illustrates a system 900 for detecting/identifying novel material samples by implementing any one of the computer-implemented methods described herein such as, for example, one or more of the methods 100 through 700, according to some embodiments. The system 900 includes a measurement component 924, a computation component 926, and one or more input/output devices 916.

The measurement component 924 is configured to measure one or more characteristic features/properties of the material samples. The measurement component 924 can be various measurement tools to measure material properties including, for example, one or more of an optical feature, a texture feature, an acoustical feature, an elastic feature, a structural feature, an electronic feature, a magnetic feature, electrets, or a mechanical feature. In some embodiments, the measurement component 924 can include, for example, a digital camera of a mobile phone for capturing one or more images of material samples.

Figure 9:
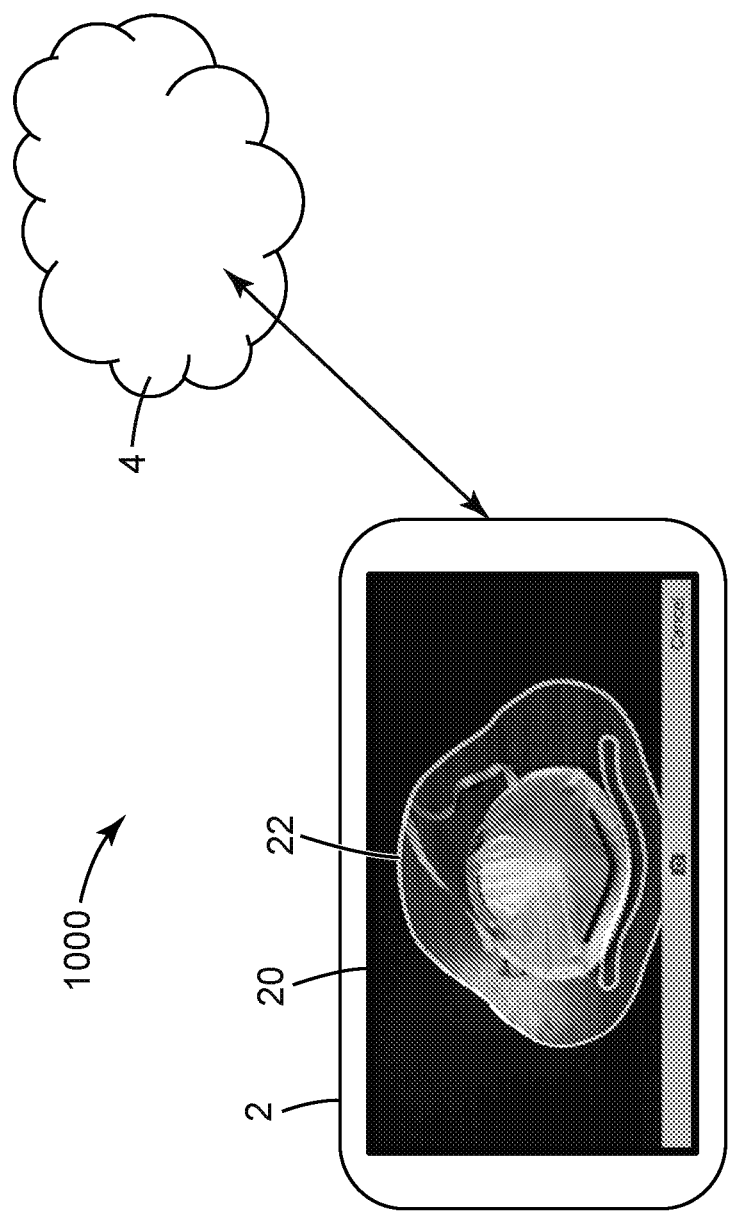
FIG. 9 illustrates a schematic diagram of a mobile device connected to a Cloud computing environment for detecting anomalous product, according to one embodiment.

In the embodiment of FIG. 9, the computation component 926 includes a processor 912 and a memory 914. The computation component 926 is functionally connected to the measurement component 924 (e.g., a digital camera), receives signals related to the measured features (e.g., digital images for material samples) from the measurement component 924. With the input training data (e.g., training images), the processor 912 can further train a transformation function to obtain a trained classification algorithm by implementing the method 600, according to some embodiments. The processor 912 can then process a test image of a test sample with the trained transformation function to obtain a transformed matrix, according to some embodiments.

The image data and the trained transformation function can be stored in the memory 914. In some embodiments, the memory 914 may have a database to store image-related data including, for example, all the captured sample images and metadata of the images. Metadata may include, for example, timestamp of images, device time, IP address, user information, locations, etc.

In some embodiments, when a test material sample is to be authenticated, one or more corresponding characteristic features (e.g., a digital image) of the test material sample can be measured by the measurement component 924 (e.g., a digital camera). The computation component 926 can receive signals related to the measured features (e.g., digital images for material samples) from the measurement component 924 and process the signals. The processor 912 can process the test image to extract computer-vision features (e.g., feature vector) by implementing the method 500, according to some embodiments. The processor 912 can then process, via the trained transformation function, the feature vectors to obtain a measure of similarity/reconstruction error, according to the methods 300 or 400. In some embodiments, the processor 912 can directly process the test image with the trained transformation function to compute a reconstruction error, according to the methods 600 or 700.

In some embodiments, the measurement component 924 may be a digital camera of a mobile device (e.g., a mobile phone) that can work in field. The measurement component 924 can wirelessly communicate with a remote computing device such as, for example, the computation component 926 by sending and receiving signals. The computation component 926 may be integrated with, for example, a computer, a server, a mobile phone, etc. The computation component 926 can process the received material property signals and send the information of anomalous product identification to the input/output device 916 to display thereon.

The memory 914 stores information. In some embodiments, the memory 914 can store instructions for performing the methods or processes described herein. In some embodiments, computer-vision feature data and the untrained, trained transformation function can be pre-stored in the memory 914. The computer-vision feature data may represent various material properties from the material samples, for example, an optical feature, a texture feature, an acoustical feature, an elastic feature, a structural feature, an electronic feature, a magnetic feature, an electrets-related feature, or a mechanical feature.

The memory 914 may include any volatile or non-volatile storage elements. Examples may include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include hard-disk, magnetic tape, a magnetic or optical data storage media, a compact disk (CD), a digital versatile disk (DVD), a Blu-ray disk, and a holographic data storage media.

The processor 912 may include, for example, one or more general-purpose microprocessors, specially designed processors, application specific integrated circuits (ASIC), field programmable gate arrays (FPGA), a collection of discrete logic, and/or any type of processing device capable of executing the techniques described herein. In some embodiments, the processor 912 (or any other processors described herein) may be described as a computing device. In some embodiments, the memory 914 may be configured to store program instructions (e.g., software instructions) that are executed by the processor 912 to carry out the processes or methods described herein. In other embodiments, the processes or methods described herein may be executed by specifically programmed circuitry of the processor 912. In some embodiments, the processor 912 may thus be configured to execute the techniques for detecting novel material samples described herein. The processor 912 (or any other processors described herein) may include one or more processors.

Input/output device 916 may include one or more devices configured to input or output information from or to a user or other device. In some embodiments, the input/output device 916 may present a user interface such as, for example, a graphical user interface (GUI) 918 where a user may control the anomalous product identification. For example, the input/output 916 may include a display screen for presenting visual information to a user. In some embodiments, the display screen includes a touch sensitive display. In some embodiments, the input/output 916 may include one or more different types of devices for presenting information to a user. The input/output 916 may include, for example, any number of visual (e.g., display devices, lights, etc.), audible (e.g., one or more speakers), and/or tactile (e.g., keyboards, touch screens, or mice) feedback devices. In some embodiments, the input/output devices 916 may represent one or more of a display screen (e.g., a liquid crystal display or light emitting diode display) and/or a printer (e.g., a printing device or component for outputting instructions to a printing device). In some embodiments, the input/output device 916 may be configured to accept or receive program instructions (e.g., software instructions) that are executed by the processor 912 to carry out the embodiments described herein.

The system 900 may also include other components and the functions of any of the illustrated components including the processor 912, the memory 914, and the input/output devices 916 may be distributed across multiple components and separate devices such as, for example, computers. The system 900 may be configured as a workstation, desktop computing device, notebook computer, tablet computer, mobile computing device, or any other suitable computing device or collection of computing devices. The system 900 may operate on a local network or be hosted in a Cloud computing environment. The illustrated components of FIG. 8 are shown merely to explain various aspects of the present disclosure and the addition or removal of components would be apparent to one of skill in the art.

FIG. 9 illustrates a novelty-detection system 1000, according to another embodiment. The system includes a graphical user interface (GUI) 20 provided to a mobile device 2. The mobile device 2 is capable of obtaining, via the GUI 20, one or more digital images for material samples. In the depicted embodiment, the mobile device 2 is a smartphone incorporating a digital camera (not shown). The GUI 20 includes a visual aide 22 to guide a user to capture the sample images. The visual aide 22 can include a box shaped to accommodate the image of the sample (e.g., a respirator) to be tested. It is to be understood that any suitable camera can be used to capture images for the material samples under desired lighting conditions. In some embodiments, the sample images can be captured by a separate camera and imported into the mobile device 2. The GUI 20 can access to the sample images and send the images to a computation component to process. An exemplary computation component 926 is shown in FIG. 8. A trained transformation function is associated with the computation component. The trained transformation function is configured to evaluate the test sample images to identity whether the test sample is novel to a batch of material samples (of which the images are provided to the transformation function as training images), and return the decision to the GUI 20 to display to the user.

The mobile device 2 can be wirelessly connected to a Cloud computing environment 4. In some embodiments, the computation component can be a remote computation component located in the Cloud computing environment 4 and functionally connected to the mobile device, configured to receive the images from the GUI 20, and process the images. In some embodiments, the computation component can be located in the mobile device 2. In some embodiments, the computation component may include multiple, functionally connected processors distributed in the Cloud computing environment 4 and the mobile device 2. The sample images can be processed in a manner of distributed computing. The results of the image processing can be stored in a database locally or in the Cloud computing environment 4. The location and/or timestamp of various material samples can also be stored in the database. In some embodiments, the GUI 20 can access to a database that stores location information and timestamps of various counterfeits and/or authentic products, and query the database upon a user's request.

Listing of Exemplary Embodiments

Exemplary embodiments are listed below. It is to be understood that any of embodiments 1-20 and 21-26 can be combined.

Embodiment 1 is a computer-implemented method of anomalous product identification, the method comprising:
 providing a test image of a test sample as an input to a trained transformation function associated with a processor, the trained transformation function being obtained by training a transformation function with training images of a batch of material samples;
 processing, via the processor, the test image with the trained transformation function to obtain a transformed matrix; and
 comparing a measure of similarity of the test image based on the transformed matrix to a threshold to determine whether the test sample is novel to the batch of material samples,
 wherein the measure of similarity is computed, via the processor, between the transformed matrix and an optional reference matrix, and the reference matrix originates from the test image without being processed by the trained transformation function.

Embodiment 2 is the method of embodiment 1, wherein the transformation function includes a one class support vector machine (SVM) algorithm.

Embodiment 3 is the method of embodiment 2, wherein processing the test image further comprises extracting computer-vision features from the test image to obtain a feature vector, and providing the feature vector to the one class SVM algorithm.

Embodiment 4 is the method of embodiment 2 or 3, wherein the measure of similarity is a scalar number.

Embodiment 5 is the method of any one of embodiments 1-4, wherein the transformation function includes a projection based reconstruction algorithm.

Embodiment 6 is the method of embodiment 5, wherein the projection based reconstruction algorithm includes at least one of a principal component analysis (PCA), a robust PCA, a dictionary learning, an independent component analysis (ICA), a principal component pursuit (PCP).

Embodiment 7 is the method of embodiment 5 or 6, wherein processing the test image further comprises extracting computer-vision features from the test image to obtain a feature vector, encoding and decoding the feature vector to obtain the transformed matrix which is a reconstructed vector having the same dimension as the feature vector.

Embodiment 8 is the method of embodiment 7, wherein the measure of similarity is computed, via the processor, as a reconstruction error between the transformed vector and the feature vector.

Embodiment 9 is the method of embodiment 1, wherein the transformation function includes an auto-encoder based reconstruction algorithm including one or more neural networks.

Embodiment 10 is the method of embodiment 9, wherein the auto-encoder based reconstruction algorithm is trained by using the images of the batch of samples as input to obtain one or more trained neural networks each having one or more layers.

Embodiment 11 is the method of embodiment 9 or 10, wherein processing the test image further includes encoding and decoding the test image to obtain the transformed matrix which is a reconstructed image having the same size as the test image.

Embodiment 12 is the method of embodiment 11, wherein the measure of similarity is computed, via the processor, as a reconstruction error between the reconstructed image and the test image.

Embodiment 13 is the method of embodiment 1, wherein the transformation function includes one or more convolutional neural networks (CNN).

Embodiment 14 is the method of embodiment 13, wherein the one or more convolutional neural networks (CNN) include at least one super-resolution CNN.

Embodiment 15 is the method of any one of embodiments 1-14, wherein the reference matrix originates from the test image without being processed by the trained transformation function Embodiment 16 is the method of embodiment 1, wherein the batch of material samples that contain substantially the same material configurations and/or are produced by substantially the same processes.

Embodiment 17 is the method of embodiment 1, further comprising identifying the test sample to be authentic or counterfeit.

Embodiment 18 is the method of embodiment 1, wherein the threshold is computed, via the processor, from reconstruction errors of validation images by processing the validation images with the trained transformation function.

Embodiment 19 is the method of embodiment 16, wherein the validation images include one or more of the training images.

Embodiment 20 is the method of embodiment 16, wherein the validation images and the training images are different and are obtained from material samples belong to the same batch of material samples.

Embodiment 21 is a system of detecting anomalous product, the system comprising:
- a graphical user interface (GUI) provided to a mobile device, the mobile device being capable of obtaining, via the GUI, one or more test images for a test material sample;
- a computation component functionally connected to the mobile device, configured to receive the test images from the GUI, and process the images; and
- a trained transformation function associated with the computation component, the trained transformation function when executed by the computation component, to transform the images to a transformed matrix, and return a result of evaluation of the transformed matrix to the GUI of the mobile device.

Embodiment 22 is the system of embodiment 21, wherein evaluation of the transformed matrix comprises computing a measure of similarity of the image based on the transformed matrix.

Embodiment 23 is the system of embodiment 21 or 22, wherein evaluation of the transformed matrix further comprises comparing the measure of similarity of the test image to a threshold to determine whether the test sample is novel to a batch of material samples, wherein the trained transformation function is obtained by training a transformation function by using images of the batch of material samples.

Embodiment 24 is the system of any one of embodiments 21-23, further comprising a database functionally connected to the computation component, a result of the evaluation of the sample being logged in the database.

Embodiment 25 is the system of any one of embodiments 21-24, wherein the trained transformation function is further configured to identify the sample be authentic or counterfeit.

Embodiment 26 is the system of any one of embodiments 21-25, wherein the GUI of the mobile device is functionally connected to a Cloud computing environment where the computation component is located.

Exemplary embodiments of the present disclosure may take on various modifications and alterations without departing from the spirit and scope of the disclosure. Accordingly, it is to be understood that the embodiments of the present disclosure are not to be limited to the described exemplary embodiments, but are to be controlled by the limitations set forth in the claims and any equivalents thereof.

Reference throughout this specification to "one embodiment," "certain embodiments," "one or more embodiments," or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. These and other embodiments are within the scope of the following claims.

What is claimed is:

1. A computer-implemented method of anomalous product identification, the method comprising:
   providing, by a processor, a test image of a test sample as an input to a trained transformation function that is obtained by training a transformation function with training images of a batch of material samples;
   executing, by the processor, the trained transformation function using the test image as the input, to obtain a transformed matrix;
   comparing, by the processor, the transformed matrix to a reference matrix to compute a measure of similarity associated with the test image;
   computing, by the processor, a threshold value from reconstruction errors of validation images by processing the validation images with the trained transformation function;
   comparing the measure of similarity to the threshold value; and
   based on the comparison of the measure of similarity to the threshold value, determining, by the processor, that the test sample is novel to the batch of material samples.

2. The method of claim 1, wherein the trained transformation function includes a one class support vector machine (SVM) algorithm.

3. The method of claim 2, further comprising:
extracting, by the processor, computer-vision features from the test image to obtain a feature vector; and
providing, by the processor, the feature vector to the one class SVM algorithm.

4. The method of claim 2, wherein the measure of similarity is a scalar number.

5. The method of claim 1, wherein the trained transformation function includes a projection-based reconstruction algorithm.

6. The method of claim 5, wherein the projection-based reconstruction algorithm includes a principal component analysis (PCA) technique.

7. The method of claim 5, further comprising extracting, by the processor, computer-vision features from the test image to obtain a feature vector, wherein executing the trained transformation function comprises encoding and decoding the feature vector to obtain the transformed matrix as a reconstructed vector having a same dimension as the feature vector.

8. The method of claim 7, wherein the measure of similarity represents a reconstruction error between the transformed vector and the feature vector.

9. The method of claim 1, wherein the trained transformation function includes an autoencoder-based reconstruction algorithm that includes one or more neural networks.

10. The method of claim 1, wherein the batch of material samples contain substantially same material configurations and/or are produced by substantially same processes.

11. The method of claim 1, further comprising identifying the test sample to be counterfeit based on the determination that test sample is novel to the batch of material samples.

12. The method of claim 1, wherein the validation images include one or more of the training images.

13. The method of claim 1, wherein the validation images and the training images are different and are obtained from material samples of a same batch of material samples.

14. The method of claim 1, further comprising identifying the test sample as a new sample to be identified based on the determination that test sample is novel to the batch of material samples.

15. A system for anomalous product identification, the system comprising:
a memory configured to store a test image of a test sample; and
a processor in communication with the memory, the processor being configured to:
provide test image stored to the memory as an input to a trained transformation function that is obtained by training a transformation function with training images of a batch of material samples;
execute the trained transformation function using the test image as the input, to obtain a transformed matrix;
compare the transformed matrix to a reference matrix to compute a measure of similarity associated with the test image;
compute a threshold value from reconstruction errors of validation images by processing the validation images with the trained transformation function;
compare the measure of similarity to the threshold value; and
based on the comparison of the measure of similarity to the threshold value, determine whether the test sample is novel to the batch of material samples.

16. The system of claim 15, wherein the processor is further configured to identify the test sample to be counterfeit based on the determination that test sample is novel to the batch of material samples.

17. The system of claim 15, wherein the processor is further configured to identify the test sample as a new sample to be identified based on the determination that test sample is novel to the batch of material samples.

18. The system of claim 15, wherein the validation images include one or more of the training images.

19. The system of claim 15, wherein the validation images and the training images are different and are obtained from material samples of a same batch of material samples.

* * * * *